May 21, 1968 G. KUSKEVICS ET AL 3,384,107
BAKEABLE VACUUM VALVE
Filed March 31, 1965
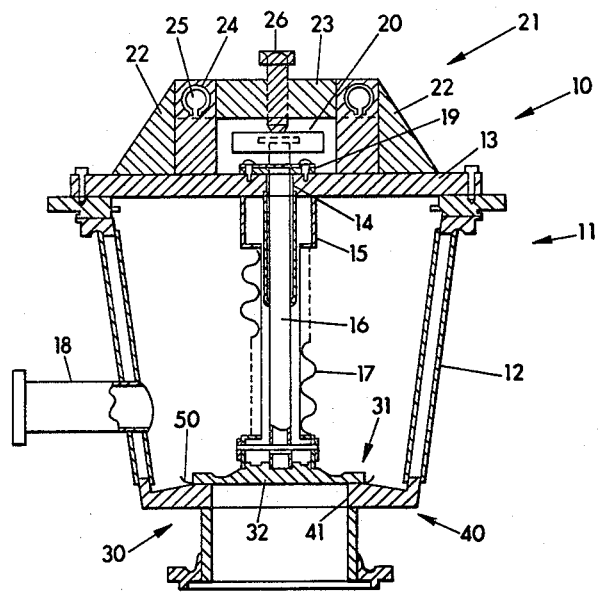
*Fig. 1*
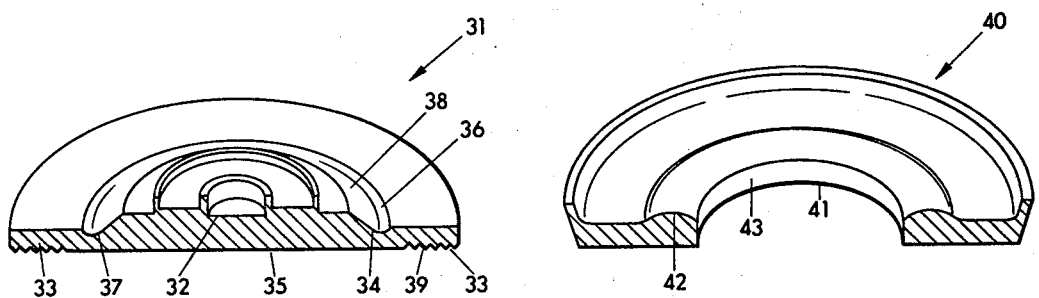
*Fig. 2*  *Fig. 3*
INVENTORS:
GUNTIS KUSKEVICS
CARL W. SCOTT
ATTORNEY:
WILLIAM A. KEMMEL JR.

3,384,107
BAKEABLE VACUUM VALVE
Guntis Kuskevics, South Pasadena, and Carl W. Scott, Sierra Madre, Calif., assignors to Electro-Optical Systems, Inc., Pasadena, Calif., a corporation of California
Filed Mar. 31, 1965, Ser. No. 444,301
8 Claims. (Cl. 137—329.05)

The present invention relates in general to a sealing means for a vacuum valve and more particularly relates to a new means for effecting a bakeable and repeatable foil seal suitable for an ultra high vacuum system.

Prior art discloses various vacuum seals for valves, their variety depending upon the need to be filled. Perhaps most widely used are elastomeric O-ring seals. However, in spite of wide use, O-ring seals present many disadvantages. For example, their use is confined to a narrow temperature range, extremes of heat or cold causing charring or freezing, with resulting leakage. Additionally, they have a large outgassing rate and produce hydrocarbon contamination. Frequent replacement is necessary and costs therefor can be high. Metal seals, that is the use of metal against metal, are less widely used. Although metal seals overcome in a measure some of the disadvantages of the elastomeric O-ring seals, they have other disadvantages such as a limited choice of metals, problems concurrent with large apertures, precise machining of surfaces with attendant high precision costs, and the metal gasket. Continual efforts have been made to overcome the many disadvantages of seals and specifically frequent unreliability, in connection with their use in a vacuum system. They is a very real need for a satisfactory seal, a seal which would be inexpensive and still reliable under extreme temperatures, a seal adaptable for large as well as small apertures, a seal which could be used without replacement after each opening of the valve, and one which would be satisfactory for use in an ultra high vacuum system.

The present invention provides these improvements, solving many problems and frustrations inherent in the vacuum valve seals known to the prior art.

It is, therefore, an object of the present invention to provide a satisfactory bakeable vacuum valve seal which is bakeable in either the open or closed position of the valve.

It is another object of the present invention to provide a vacuum valve seal which replaces seals known to the prior art with a reliable metal foil seal effective over a wide temperature range.

It is a further object of the present invention to provide a means, susceptible of being fashioned from a wide variety of metals, of special contour to effect a reliable hermetic seal in connection with the use of metal foil for use in an ultra high vacuum system.

It is another object of the present invention to provide a satisfactory bakeable vacuum valve seal which is commercially adaptable to a wide variety of sizes of apertures ranging from a minimum of about two inches in diameter.

It is a further object of the present invention to provide a clean, inexpensive vacuum valve seal which can be used repeatedly before replacement.

The present invention introduces an important improvement over the known prior art in vacuum valve seals by eliminating many disadvantages encountered therein and providing a means which results in a reliable hermetic seal for use in an ultra high vacuum system. Said means comprises an annular valve seat having a smooth, convex surface, a circular valve plate adapted to make repeatable sealing contact over successive inner annular portions of said convex surface and a layer of metal foil being interposed between the valve plate and valve seat, which foil is repeatedly used without replacement. This seal which results from the present invention is a reliable hermetic seal maintained over a wide temperature range, bakeable in the open or closed position of the valve, and repeatable without replacement of the foil for frequent opening and closing of the valve whether the valve opening be large or small.

The novel features which are believed to be characteristic of the present invention both as to its organization and method of operation together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIG. 1 is a longitudinal cross-sectional view of a vacuum valve within a pipe in a closed position with entrance and exit passages, wherein the present invention is incorporated.

FIG. 2 presents an enlarged cross-sectional view of the valve plate illustrated in FIG. 1.

FIG. 3 is an enlarged cross-sectional view of the valve seat illustrated in FIG. 1.

As illustrated in FIGS. 1–3, the present invention involves a valve 10 having a housing 11 including double side walls 12 surmounted by a cover 13 and supporting the valve seat 40. The valve seat 40 has a central aperture 41 which, in conjunction with the side aperture 18 and the side walls 12, permits the flow through the valve when it is open. The cover 13 has an aperture 14 opening to a bushing 15 in which is slidably mounted the seal shaft 16. Mounted on the lower end of the seal shaft 16 is the valve plate 31 which, with the valve seat 40 and metal foil 50, forms sealing means 30. Extending between the valve plate 31 and the cover 13 is a bellows 17 which encloses the seal shaft 16 and prevents leakage into the valve housing. The upper end of the seal shaft 16 extends through a seal 19 to the exterior of the valve 10 and has a cap 20 mounted thereon. Positioned adjacent to the cap 20 of the seal shaft 16 is the positioning means 21. The positioning means 21 includes a pair of posts 22 mounted on the cover 13 and separated by the cap 20. Mounted on the posts 22 is a bridge clamp 23 which is adapted to be selectively released from either of the posts 22. Specifically, the posts 22 have bores 24 which are adapted to be aligned with a port (not shown) in the end of the bridge clamp 23 and through which a pin 25 is inserted. Threaded into the central portion of the bridge clamp 23 is a set screw 26 whose lower end is adapted to contact the cap 20 of the seal shaft 16.

As noted above, the sealing means 30 of the valve 10 includes a valve plate 31 separated from the valve seat 40 by the metal foil 50. As illustrated in detail in FIG. 2, the valve plate 31 has a relatively thick central portion 32 to which the seal shaft 16 and bellows 17 are attached. Surrounding the central portion 32 of the valve plate 31 is an edge portion 33 having a reduced uniform thickness. The edge portion 33 is separated from the central portion 32 by an intermediate annular recess 34 which is adapted to permit the edge portion 33 to flex upwardly on the application of force to the bottom 35 of the valve plate 31 by the valve seat 40. More specifically, the recess 34 is adapted to permit the edge portion 33 to assume a range of upward displacement positions in response to a substantially constant force applied to the valve plate 31 by the seal shaft 16. Such relationship can be approximated by the equation:

$$S_{max} = \frac{MR}{I_0/c} k^3$$

where: $S_{max}$ is the maximum stress in lbs. per square inch applied to the edge portions by the valve seat in reaction to the pressure applied to the valve plate by the seal shaft; $M$=moment in lbs.-inches per inch due to the valve seat load in the edge portion; $R$=the radius in inches to the edge portion cross section centroid; $E$=the elastic modulus in p.s.i.; $I_0$=the moment of inertia in inches$^4$ of the edge portion cross section, neutral axis perpendicular to the edge portion axis; $c$=half the depth of the edge portion perpendicular to the neutral axis; and $k$=an empirical constant dependent on the depth and configuration of the annular recess. For the derivation of the general formula apart from the specific configuration of the present invention see Roark, "Formulas for Stress and Strain," p. 230, 3rd edition (1954).

A specific example of a valve plate constructed in accordance with the present invention is a valve plate having a configuration as in FIG. 2 formed of steel wherein the outer diameter is 8 inches, the central portion 32 is 0.63 inch thick, and the edge portion 33 is 0.32 inch thick. The inner diameter of the edge portion is 5.5 inches which defines the relatively vertical outer wall 36 of the recess 34. The recess 34 has a substantially circular cross section base 37 with a ⅛ inch radius whose maximum depth leaves a thickness of 0.05 inch between the base 37 of the recess and the bottom 35 of the valve plate 31. The inner wall 38 of the recess 34 tapers upwardly at an angle of about 45° from the outer limit of the central portion of the valve plate 31.

In addition, the valve plate 31 has a plurality of photograph record-like grooves 39 in the bottom surface 35 under the edge portion 33. Such grooving is adapted to reduce the contact area of the valve plate 31 with the valve seat 40 and thus reduce the required pressure necessary to achieve a reliable seal. Also, such grooving is adapted to permit successive contacts of the valve plate 31 with the valve seat 40 over the convex inner surface of the valve seat 40 as discussed below. The groove 39 depth and width is designed so that at the contact pressure of the valve plate with the valve seat it does not exceed the Brinelling pressure of the metal foil therebetween. In the specific example of the valve plate noted above, the cross section of the grooves forms approximately a 60° angle so that the width and depth are both about 0.008 inch with the radius of curvature of the base and the edges being about 0.002 inch.

Positioned in a face-to-face relationship with the valve plate 31 is the stationary annular metal valve seat 40 which is illustrated in detail in FIG. 3. The valve seat 40 has a central aperture 41 surrounded by a central annular ridge or convex surface 42 which is smooth and tapers inwardly. Preferably, the convex surface 42 has a circular cross section. The valve seat 40 is adapted to permit contact of the valve plate 31 with the valve seat 40 over successive inner annular portions of the convex surface of the valve seat 40 as the valve plate 31 and valve seat 40 are brought successively closer together. In other words, when the valve plate 31 and valve seat 40 are brought closer together by inserting the seal shaft 16 further into the valve 10, the edge portions 33 of the valve plate 31 in contact with the valve seat 40 flex upwardly and the central portion 32 of the valve plate 31 advances into the central aperture 41 of the valve seat 40.

A specific example of the valve seat 40 of the present invention is the valve seat 40 shown in FIG. 3 which has been used in conjunction with the aforementioned specific example of the valve plate 31. Such valve seat has an outer diameter of 11.75 inches with the central aperture having a diameter of 6.0 inches. The wall thickness 43 of the central aperture is about 0.90 inch. The annular ridge 42 has a maximum height of 0.10 inch above the aperture wall and a radius of curvature of 2.0 inches with the center of curvature being located on a circumferential line having a diameter of 7.25 inches. The curvature of the ridge forms a smooth and inwardly tapering convex surface which contacts the upper boundary of the central aperture wall. The outer diameter of the ridge is 8.00 inches.

Between the valve plate 31 and valve seat 40 is the metal foil 50 which is adapted to at least cover the bottom surface of the valve plate. The metal foil 50 is softer than the metal of the valve plate 31 or valve seat 40; thus, for example, ordinary aluminum foil having a thickness of about 0.0015 inch is suitable. Such foil initially is pressed firmly against the bottom surface of the valve plate 31 and extends over the periphery of the valve plate 31 to insure adherence thereto.

To operate the present invention, the metal foil 50 is mounted on the valve plate 31, then the set screw 26 is positioned with reference to the seal shaft 16 so that in the closed position of the valve 10 the outer grooves 36 of the valve plate 31 are forced into contact with the valve seat 40 under the desired predetermined pressure. In other words, in accordance with the valve design, a known substantially constant force is applied to the seal shaft 16 which causes the predetermined contact pressure between the valve seat 40 and the valve plate 31. The bridge clamp 23 is then brought into closed position which forces the seal shaft 16 inwardly so that the valve plate 31 contacts the valve seat 40 under said predetermined pressure. To open the valve 10, the bridge clamp 23 is merely unlocked and lifted so that bellows 17 cause the seal shaft 16 to retract upwardly and break the seal. However, because of the initial contact between the valve plate 31, the metal foil 50 adheres tightly to the valve plate 31 during the retraction of the valve plate 31 from the valve seat 40. To reuse the valve 10 and reseal the valve aperture 41, the set screw 20 is advanced a predetermined distance and then the bridge clamp 23 is again closed and locked. Such action causes the valve plate 31 to advance slightly forward in its closed position and thus the edge portions 33 to be flexed upwardly. Thus, the contact between the valve seat and the valve plate is moved inwardly to a new annular portion and thus a new sealing surface is utilized on the metal foil. However, as set forth above, the contact pressure between the valve seat 40 and the valve plate 31 remains substantially a constant because of the annular recess 34 in the valve plate 31. Such cycle can be repeated for a substantial number of times until the inner limit of the valve seat 40 is reached.

Many other specific embodiments of the present invention will be obvious to one skilled in the art in view of this disclosure. For example, if desired, the edge portions of the valve plate may initially extend downwardly to increase the available contact areas between the valve plate and the valve seat during successive uses of the valve. Also, successively increasing forces may be used for successive resealing steps.

There are many features of the present invention which clearly show the significant advance the present invention represents over the prior art. Consequently, only a few of the more outstanding features will be pointed out to illustrate the unexpected and unusual results attained by the present invention. One feature of the present invention is that it permits all metal sealing for a valve so that the valve can be operated over a wide range of temperatures, for example from a −200° C. to +300° C., and over a wide range of valve sizes. Another feature of the present invention is the use of a single metal foil to achieve repeated sealing action by using successive fresh surface portions of the metal foil. Thus, the advantages of a new metal foil each time a seal is to be obtained without the necessity of disassembling the valve and replacing the metal foil. Still another feature of the present invention is the use of a valve plate and valve seat adapted to permit the metal foil therebetween to be contacted over successive inner annular portions. In conjunction with such features is the feature of the valve plate being adapted to achieve such sealing action under a substantially constant force being applied thereto.

It will be understood that the foregoing description and examples are only illustrative of the present invention and it is not intended that the invention be limited thereto. All substitutions, alterations, or modifications of the present invention which come within the scope of the following claims or to which the present invention is readily susceptible without departing from the spirit and scope of this disclosure are considered part of the present invention.

We claim:

1. A bakeable hermetic sealing means for a vacuum valve comprising:
    (a) an annular valve seat having a smooth, inwardly tapering, convex surface;
    (b) a valve plate adapted to make sealing contact with said valve seat over successive new inner annular portions of said convex surface when said seat and plate are brought together with sufficient pressure and the valve plate is moved successively closer to the valve seat; and,
    (c) a layer of metal foil between said valve seat and valve plate.

2. A sealing means as described in claim 1 wherein said valve plate has a plurality of phonograph record-like grooves in its surface adjacent to said valve seat.

3. A sealing means as described in claim 1 which includes positioning means for placing said plate in contact with selected annular portions of said valve seat covered by said layer of metal foil.

4. A sealing means as described in claim 1 wherein said convex surface has a circular cross-section.

5. A sealing means as described in claim 1 wherein said valve plate has an intermediate annular recess separating its central portion from its edge portion and said edge portion has a reduced uniform thickness.

6. A sealing means as described in claim 5 wherein said recess and edge portions are adapted to make sealing contact under a selected, substantially constant pressure.

7. A sealing means as described in claim 2 wherein said valve plate and valve seat are metal and said layer of metal foil is softer than the metal used in said valve plate and valve seat, and is pressed firmly against the phonograph record-like grooves of the valve plate, adhering thereto for repeated use.

8. A bakeable hermetic sealing means for a vacuum valve comprising:
    (a) an annular metal valve seat having a smooth, inwardly tapering circular cross-section convex surface;
    (b) a circular metal valve plate positioned face-to-face with said valve seat, said valve plate having (I) an intermediate annular recess separating its central portion from its edge portion with said edge portion having a reduced uniform thickness and (II) a plurality of phonograph record-like grooves in its surface adjacent to said valve seat;
    (c) a layer of metal foil between said valve seat and valve plate and adhering to said valve plate grooves, said metal foil being softer than that of the metal valve seat and plate and extending up and over the periphery of said valve plate; and,
    (d) positioning means for contacting said valve plate with selected annular portions of said valve seat covered by said layer of metal foil, said valve plate and seat being adapted to make sealing contact over successive new inner annular portions of said convex surface when brought together under a selected, substantially constant pressure and the valve plate is moved successively closer to the valve seat.

References Cited

UNITED STATES PATENTS

| 2,114,858 | 4/1938 | Rosch | 251—333 |
| 2,900,999 | 8/1959 | Courtot | 251—334 X |
| 3,160,391 | 12/1964 | Medicus | 251—333 |

FOREIGN PATENTS

| 1,196,263 | 5/1959 | France. |

M. CARY NELSON, *Primary Examiner.*

A. ROSENTHAL, *Assistant Examiner.*